United States Patent

Sand et al.

[11] Patent Number: 6,059,273
[45] Date of Patent: May 9, 2000

[54] GAS SPRING ARRANGEMENT

[75] Inventors: Gunnar Sand, Huskvarna; Krister Gustafsson, Tranås, both of Sweden

[73] Assignee: Stromsholmen AB, Tranas, Sweden

[21] Appl. No.: 08/704,620

[22] PCT Filed: Feb. 9, 1995

[86] PCT No.: PCT/SE95/00129

§ 371 Date: Sep. 5, 1996

§ 102(e) Date: Sep. 5, 1996

[87] PCT Pub. No.: WO95/27157

PCT Pub. Date: Oct. 12, 1995

[30] Foreign Application Priority Data

Mar. 31, 1994 [SE] Sweden .................................. 9401119

[51] Int. Cl.[7] ...................................................... F16F 9/02
[52] U.S. Cl. ........................ 267/64.25; 267/113; 267/119; 267/224
[58] Field of Search .............................. 267/64.13, 64.25, 267/113, 119, 64.28, 224, 225

[56] References Cited

U.S. PATENT DOCUMENTS

| | | | |
|---|---|---|---|
| 1,214,343 | 1/1917 | Matthews | 267/64.25 |
| 2,977,146 | 3/1961 | Edwards et al. | 267/64.25 |
| 3,328,019 | 6/1967 | Wilson | 267/64.25 |
| 4,270,771 | 6/1981 | Fujii | 267/64.25 |

FOREIGN PATENT DOCUMENTS

| | | |
|---|---|---|
| 3446408 | 6/1989 | Germany . |
| 4000865 | 7/1991 | Germany . |
| 500544 | 7/1994 | Sweden . |
| 95/000772 | 1/1995 | WIPO ................................ 267/64.25 |

*Primary Examiner*—Matthew C. Graham
*Attorney, Agent, or Firm*—Merchant & Gould P. C.

[57] ABSTRACT

The invention relates to an arrangement for a gas spring. The arrangement comprises a cylinder (1). At its one end, this is delimited by a fixed end wall (2), and at its other end there is a first guide (3) sealed against the inner wall of the cylinder (1) and against a piston rod (4) capable of axial movement within the cylinder (1). The piston rod (4) has a second guide (8) mounted in such a way as to be capable of sliding against the inner wall. An annular piston (9) sealed against the inner wall and against the piston rod (4) is mounted on the piston rod (4) between the guides (3; 8) in such a way that it is free to slide. This divides the inner space of the cylinder (1) into a first and a second part space (12; 13). In an initial position, in which the gas spring is unaffected, there is present in the first part space (12) a pressure which is greater than the pressure present in the second part space (13). The annular piston (9) is retained between the guides (3; 8) through the effect of the pressure acting upon, on the one hand, one surface (9a) of the annular piston (9) and, on the other hand, the other surface (9b) of the annular piston (9) and the end surface (4a) of the piston rod (4).

4 Claims, 4 Drawing Sheets

GAS SPRING ARRANGEMENT

FIELD OF THE INVENTION

The present invention relates to an arrangement for a gas spring comprising a cylinder, which at its one end is delimited by a fixed end wall, and at its other end has a first guide sealed against the inner will of the cylinder and against a piston rod capable of axial movement within the cylinder, in conjunction with which the end of the piston rod facing towards the end wall is executed with a second guide mounted in such a way as to be capable of sliding against said inner wall.

BACKGROUND OF THE INVENTION

A conventional gas spring operates in a similar manner to a helical spring, i.e it produces a spring resistance equivalent to the compression from the moment at which it is affected by a force.

In many applications this force is represented by a moving part of a machine, the movement of which requires to be contained and damped. Because of metal components which strike one another with full force, this gives rise to disturbing mechanical noise and din, which cannot be accepted under current working environment legislation. Attempts have been made to dampen the contact between the moving part of the machine and the gas spring with the help of helical springs or damping elements made of an elastic material. These attempts were not particularly successful, since helical springs do not give the desired effect, and the stresses on such damping elements are considerable and the service life of the elements is accordingly very limited. Both the purchase and replacement of damping elements also involve truly daunting costs.

SUMMARY OF THE INVENTION

The object of the present invention is to eliminate the aforementioned disadvantages and to bring about an acceptable noise level having regard for working environment legislation. This is achieved in accordance with the invention in that an annular piston sealed against the aforementioned inner wall and against the piston rod is mounted on the piston rod between the aforementioned guides in such a way that it is free to slide, which annular piston divides the inner space of the cylinder between the aforementioned first guide and the end wall into a first part space delimited by the first guide and the annular piston and into a second part space delimited by the annular piston and the end wall, in that, in an initial position in which the gas spring is unaffected, there is present in the first part space a pressure which is greater than the pressure present in the second part space, such that the annular piston is retained between the aforementioned guides through the effect of the pressure acting upon, on the one hand, one surface of the annular piston and, on the other hand, the other surface of the annular piston and the end surface of the piston rod. This means that, when the piston rod is actuated by an external increasing force acting in an axial sense to the end wall of the cylinder, which causes the piston rod to be inserted gradually into the cylinder, in conjunction with which from the initial position, in which the spring force of the gas spring is negligible, to a first position of the piston rod, in which the pressures in the two part spaces are identical, the pressure in the second part space gradually approaches the pressure prevailing in the first part space, the spring force of the gas spring remains negligible compared with the spring force prevailing after passing the aforementioned first piston rod position, and so that, as the force acting upon the piston rod reduces, after passing the aforementioned first piston rod position, the spring force is once more a fraction of the spring force that was present prior to passing the first piston rod position, only to become negligible once more in the initial position.

What is achieved through the characteristics of the invention is that the spring force is negligible at the moment when mechanical contact occurs between the part of the machine and the gas spring; only after mechanical contact has been established does the gas spring produce a spring force proportional to the compression, which reduces the noise level.

BRIEF DESCRIPTION OF THE DRAWINGS

Further characteristics and advantages of the invention can be seen from the accompanying sub-claims and the following description, with reference to the accompanying drawings, which illustrate a gas spring in accordance with the invention in longitudinal section.

DETAILED DESCRIPTION OF THE PREFERRED EMBODIMENTS

Figure 1:
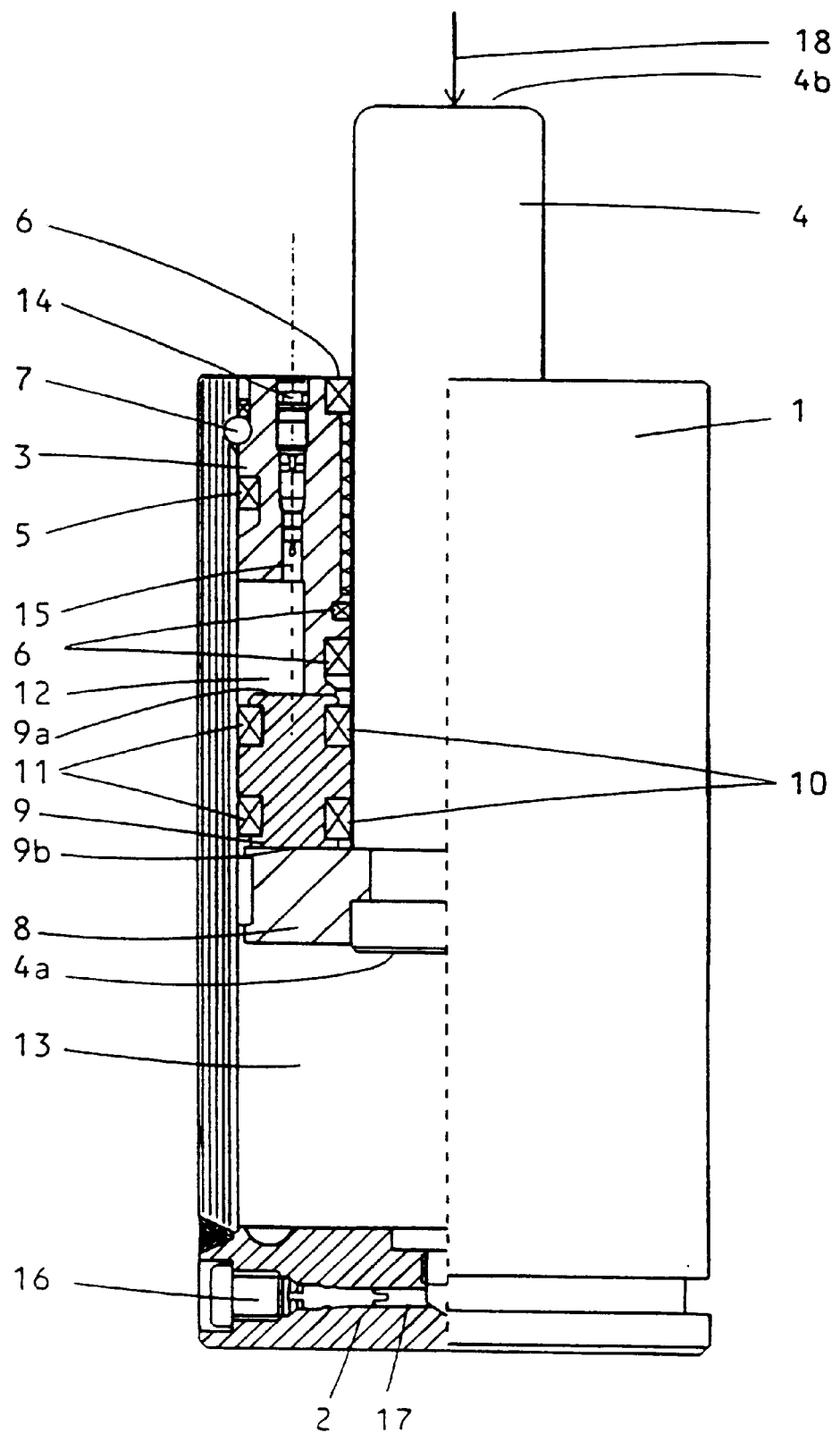
FIG. 1 accordingly shows the piston rod of the gas spring in an initial position.

The designation 1 is used in the drawings in respect of a cylinder, which at its one end is delimited by a fixed end wall 2, and which at its other end has a guide 3 for a piston rod 4 capable of axial movement within the cylinder. The guide 3 is sealed against the inner wall of the cylinder 1 by means of a static ring seal 5 and against the piston rod 4 by means of sealing rings 6, and is fixed relative to the cylinder 1 by means of a locking ring 7. At the end of the piston rod 4 facing towards the end wall 2, the piston rod 4 is executed with a guide 8 mounted in such a way as to be capable of sliding against the inner wall of the cylinder, which guide is not sealed against the cylinder wall; the piston rod 4 thus operates as a plunger piston.

In accordance with the invention, an annular piston 9 is mounted in such a way that it is capable of sliding between the guides 3 and 8 on the piston rod 4, which annular piston is sealed against the piston rod 4 and the inner wall of the cylinder 1 by means of annular seals 10 and 11, thereby dividing the inner space of the cylinder 1 between the end wall 2 and the guide 3 into two part spaces 12 and 13. A channel 15 through the guide 3 executed with a valve connection 14 discharges into part space 12, and a channel 17 through the end wall 2 with a valve connection 16 similarly discharges into part space 13.

Gas has been introduced into the part spaces via the valve connections 14 and 16, so that in an initial position illustrated in FIG. 1, the pressure prevailing inside part space 12 is higher than the pressure prevailing inside part space 13. Because the pressure in part space 12 only acts on one surface 9a of the annular piston 9, whereas the pressure in part space 13 acts on the other surface 9b of the annular piston 9 and on the end surface 4a of the piston rod 4, it is possible to select the aforementioned pressures in such a way that the annular piston 9 is held securely between the guides 3 and 8.

Figure 2:
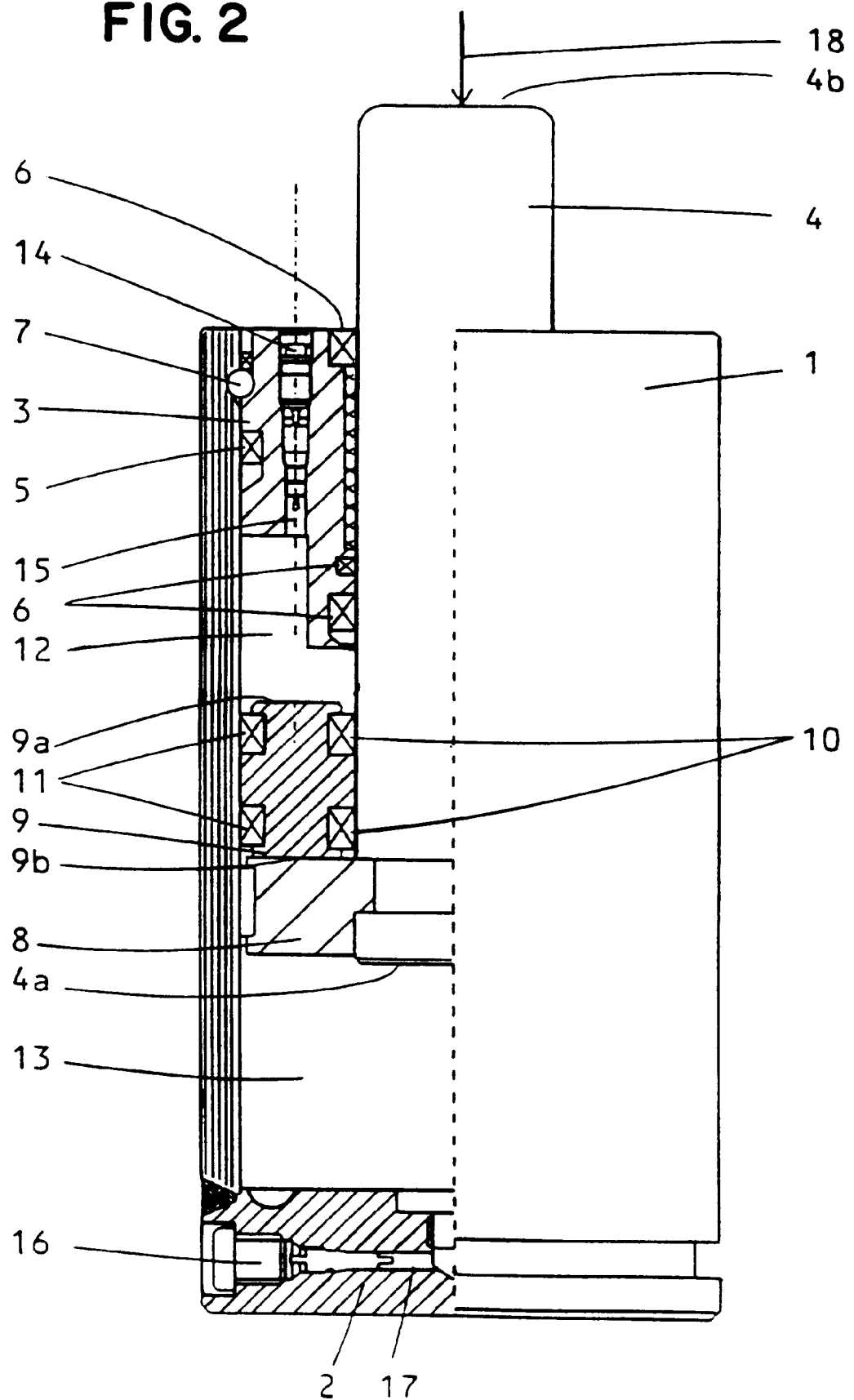
FIG. 2 shows the piston rod in a first position.
Figure 3:
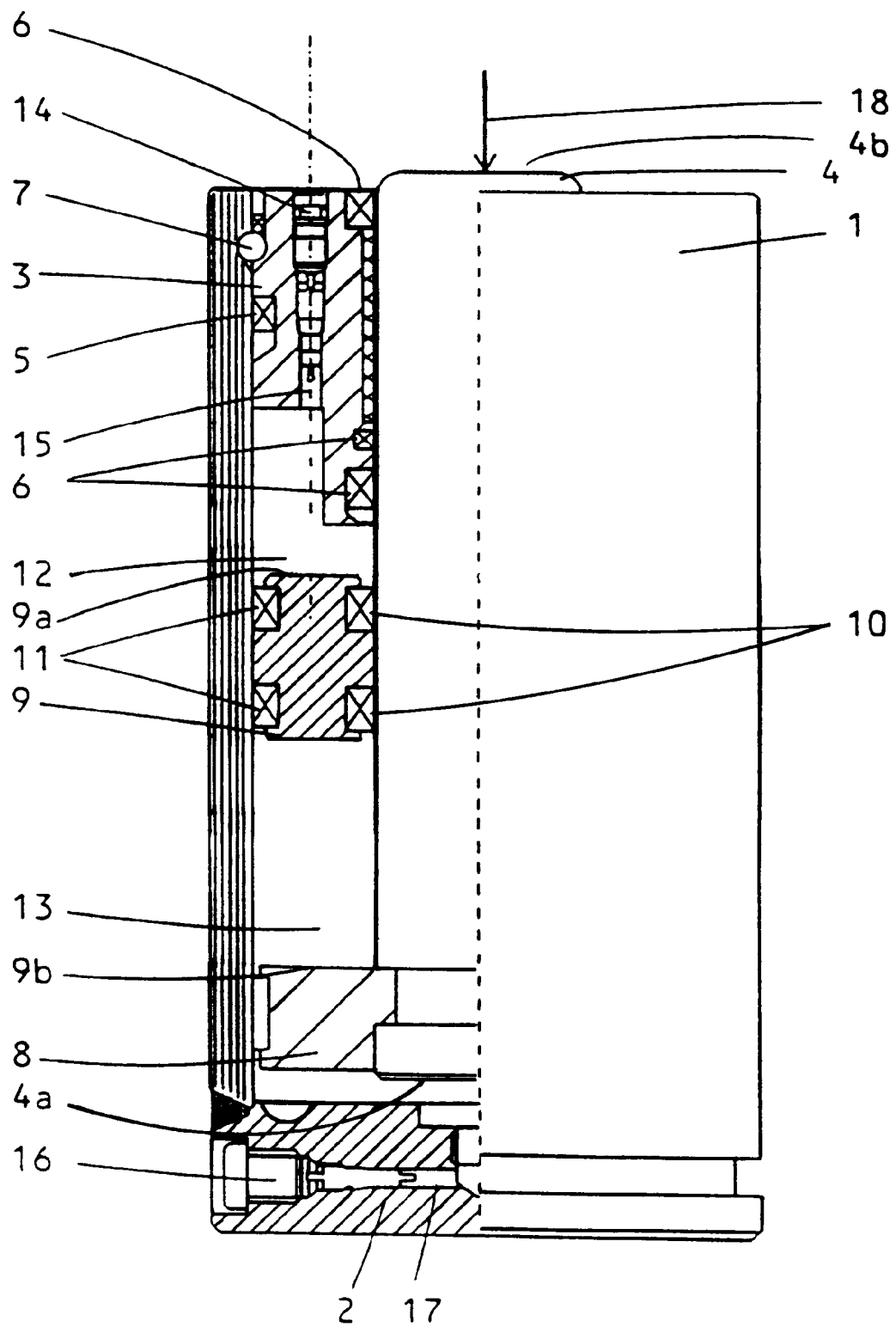
FIG. 3 shows the piston rod in an end position.
Figure 4:
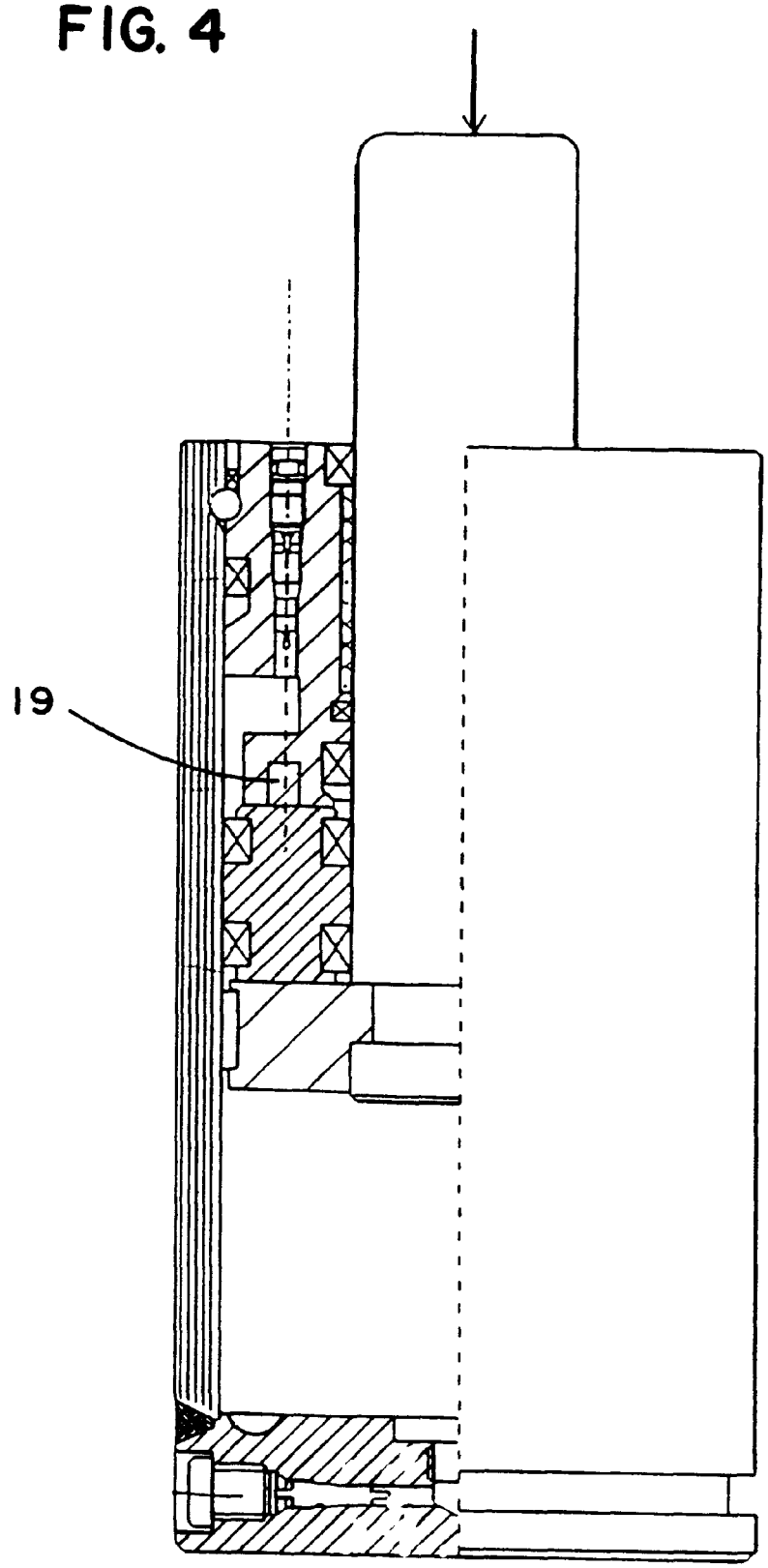
FIG. 4 shows a gas spring with a damping body made of an elastic material.

If an axial force, indicated in the drawing by an arrow 18, is applied to the outer end surface 4a of the piston rod 4, the following will occur: due to the aforementioned pressure conditions, the gas spring exhibits negligible spring force in the initial position. As the piston rod 4 moves into the cylinder, the gas pressure in part space 13 rises, and the gas pressure in part space 12 falls. In the position illustrated in FIG. 2, the pressures in part spaces 12 and 13 are assumed to be equal, and the annular piston 9 is thus able to slide freely on the piston rod 4. If the piston rod is now introduced even further into the cylinder, the gas spring will produce a spring force equivalent to the compression until the end position illustrated in FIG. 3 is finally reached.

When the force designated by the arrow 18 is reduced to zero, the process described above will occur in the reverse sequence.

According to one particular characteristic, the part space 13 is caused to communicate with a pressure source not shown in the drawing, the pressure of which is so arranged as to vary in a predetermined fashion with the position of the piston rod in the gas spring. A person skilled in the art will appreciate that this requires a sensor sensitive to the position of the piston rod, the output signal from which sensor is able to affect the pressure source in such a way that the desired pressure sequence is achieved.

According to another particular characteristic of the invention, there is present between the annular piston 9 and one or other of the guides 3 or 8 a damping body 19 made of an elastic material. The job of the damping body 19 is to further damp any residual noise.

We claim:

1. Arrangement for a gas spring comprising a cylinder (1), which at its one end is delimited by a fixed end wall (2), and which at its other end has a first guide (3) sealed against an inner wall of the cylinder (1) and against a piston rod (4) capable of axial movement within the cylinder (1), wherein an end of the piston rod (4) facing towards the end wall (2) is executed with a second guide (8) capable of sliding against said inner wall, wherein an annular piston (9) sealed against the aforementioned inner wall and against the piston rod (4) is mounted on the piston rod (4) between the first and second guides (3; 8) such that it is free to slide, which annular piston divides an inner space of the cylinder (1) between the aforementioned first guide (3) and the end wall (2) into a first part space (12) delimited by the first guide (3) and the annular piston (9) and into a second part space (13) delimited by the annular piston (9) and the end wall (2), wherein in an initial position, in which the gas spring is unaffected, a pressure in the first part space (12) is greater than a pressure in the second part space (13) such that the annular piston (9) is retained between the first and second guides (3; 8) by pressure acting upon one surface (9a) of the annular piston (9) and upon another surface (9b) of the annular piston (9) and end surface (4a) of the piston rod.

2. Arrangement in accordance with patent claim 1, wherein the second part space (13) communicates with a pressure source, a pressure of which varies in a predetermined fashion with a position of the piston rod in the gas spring.

3. Arrangement in accordance with patent claim 1, wherein a damping body (19) made of an elastic material is introduced between the annular piston (9) and the first guide (3).

4. Arrangement in accordance with patent claim 1, wherein a damping body (19) made of an elastic material is introduced between the annular piston (9) and the second guide (8).

* * * * *